(12) United States Patent
Sun

(10) Patent No.: US 7,823,325 B2
(45) Date of Patent: Nov. 2, 2010

(54) WATER-SAVING WATERING AND FERTILIZING DEVICE AND METHOD

(76) Inventor: Bao-Lin Sun, 92, Jhongsiao St., Young-An Township, Kaohsiung County 828 (TW)

( * ) Notice: Subject to any disclaimer, the term of this patent is extended or adjusted under 35 U.S.C. 154(b) by 201 days.

(21) Appl. No.: 12/004,697

(22) Filed: Dec. 19, 2007

(65) Prior Publication Data

US 2009/0158649 A1  Jun. 25, 2009

(51) Int. Cl.
*A01G 29/00* (2006.01)
(52) U.S. Cl. .......................................... 47/48.5
(58) Field of Classification Search ................ 47/48.5, 47/79; 71/64.13; 111/118
See application file for complete search history.

(56) References Cited

U.S. PATENT DOCUMENTS

| | | | | |
|---|---|---|---|---|
| 419,242 A | * | 1/1890 | Brown | 47/48.5 |
| 2,032,608 A | * | 3/1936 | Antrim | 47/48.5 |
| 2,145,934 A | * | 2/1939 | Kingman | 47/47 |
| 2,931,140 A | * | 4/1960 | Laffler et al. | 47/48.5 |
| 3,060,012 A | * | 10/1962 | Pavek | 71/64.13 |
| 3,304,653 A | * | 2/1967 | Zadarnowski | 47/48.5 |
| 5,809,692 A | * | 9/1998 | Kesler | 47/48.5 |
| 5,975,797 A | * | 11/1999 | Thomas et al. | 405/45 |

* cited by examiner

*Primary Examiner*—Rob Swiatek
(74) *Attorney, Agent, or Firm*—Pro-Techtor Int'l Services; Ralph Willgohs

(57) ABSTRACT

A watering and fertilizing device comprises at least one fertilizing column and a water supply system. The fertilizing columns are vertically inserted in soil, surrounding roots of a plant to be watered. Water from the water supply system enters the fertilizing columns, taking along fertilizer contained therein and further dripping into surrounding soil at a constant rate, so that the plant is effectively supplied with water and nutrients without waste of water. The water supply system optionally provides besides water water-soluble fertilizer, which flows into soil along with water.

7 Claims, 4 Drawing Sheets

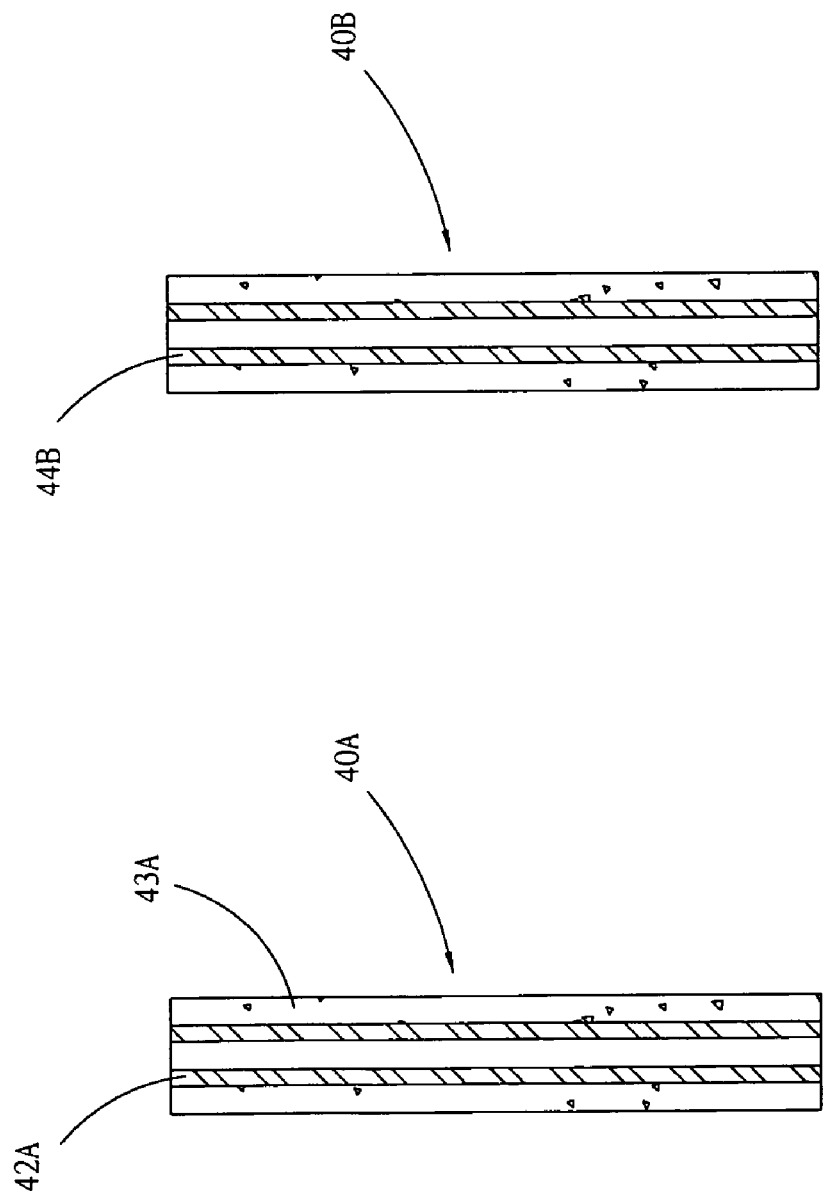

WATER-SAVING WATERING AND FERTILIZING DEVICE AND METHOD

FIELD OF THE INVENTION

The present invention relates to a watering and fertilizing device and a watering and fertilizing method, particularly to a device and method for watering and fertilizing plants which saves water and is suitable for a dry environment, e.g., in a desert environment.

BACKGROUND OF THE INVENTION

Desertification, urbanization and population growth have reduced areas which an be used for conventional agriculture. Therefore, agriculture has been increasingly developed in desert or mountain areas, which require effective techniques for watering and fertilizing.

In the past, areas with limited water supply were often treated with anorganic fertilizers and pesticides. Excessive use thereof has led to acidity of soil. Hence stopping degradation and pollution of soil with minimum waste of water has become an important object of agricultural technology.

Conventionally, watering of agricultural plants is performed from a surface of the ground. Water is led via a canal or a pipe to an area to be watered and directly spilled on the ground. Evaporation, seeping and draining away of water, however, result in waste of water.

As an improvement, spraying of water on plants has been used. Therein, a pipe is led to an area to be watered. Water is sprayed into the air above plants, which thereby are watered. As compared to direct spilling of water, efficiency of spraying is higher, but losses due to evaporation are still high, amounting typically to more than 20%. Wind with varying strength and direction adds to waste of water, and spraying on hillsides is not uniform. Furthermore, cost of installing and maintaining pipes, spraying heads and pumps is high.

Conventional watering of plants is therefore wasteful. A further undesired effect thereof is washing out and subsequent sealing of soil surfaces, leading to applied water is not being able to enter soil immediately and being absorbed by soil.

Moreover, conventional watering of plants results in permanently wet soil surfaces, furthering growth of weeds, which in turn consume water and are removed only by costly or environmentally damaging methods, like applying herbicides.

As a response to aforementioned problems, a novel agricultural technique of drip-watering has been developed in Israel, allowing to cultivate trees and other agricultural plants in desert areas. Therein, pipes are laid out in fields, having holes with defined diameters at certain mutual distances, allowing water to drip out at a well-defined rate and at needed locations. Almost no losses by evaporation or seeping away occur, and liquid fertilizer is readily mixed with dripping water to achieve the objects of both watering and fertilizing plants.

However, structural parts required for a conventional drip-watering, a pump, a main pipe, branching pipes, a controlling device, and drip heads, are costly. Furthermore, local differences in water pressure need to be balanced to ensure uniform watering, which is especially important in hillside areas.

Conventional drip watering is performed underground, typically at a depth of about 10 cm. For that purpose, branching pipes are laid underground. Thereby, roots of plants are reached directly by water, so that efficiency is high. However, laying pipes underground and providing for pumps is expensive and not affordable for many common farmers. If negative pressure of supply water is applied, dirt and mood are sucked into the drip heads and pipes, resulting in subsequent failures. Maintenance of conventional drip watering systems is time-consuming and costly.

Conventional fertilizing by anorganic substances like nitrogen, phosphates or potash helps to increase agricultural production, but kills useful microorganisms and earthworms and contributes to sealing of soil.

If fertilizer is applied to the ground surface or upper layers of soil, deeper layers of soil are not fertilized. Consequently, growth of roots concentrates on upper layers of soil, typically up to a depth of 20 cm. Deeper roots do not sufficiently develop, so that natural retrieving of water from deeper ground is not achieved, as is important in dry areas like deserts.

SUMMARY OF THE INVENTION

It is the object of the present invention to provide a watering and fertilizing device for plants in dry areas like deserts and a method for watering and fertilizing plants in dry areas.

For achieving above object, the present invention comprises at least one fertilizing column and a water supply system. The fertilizing columns are vertically inserted in soil, surrounding roots of a plant to be watered. Water from the water supply system enters the fertilizing columns, taking along fertilizer contained therein and further dripping into surrounding soil at a constant rate, so that the plant is effectively supplied with water and nutrients without waste of water. The water supply system optionally provides besides water water-soluble fertilizer, which flows into soil along with water.

The fertilizing columns contain basic nutrients, preferably organic material which furthers growth of useful microorganisms and earthworms to enhance biodiversity of soil.

By releasing water and fertilizer directly into soil, no water is wasted and no soil is washed out or sealed and hence not degraded by watering.

Watered plants grow around the fertilizing columns and are thereby increasingly more effectively watered and nurtured.

The present invention enhances quality of soil and is therefore suitable for usage in the desert or another adverse environment, while being of a simple and inexpensive structure.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 3 is a longitudinal sectional view of one of the fertilizing columns of the present invention in the second embodiment.

FIG. 4 is a longitudinal sectional view of one of the fertilizing columns of the present invention in the third embodiment.

DESCRIPTION OF THE PREFERRED EMBODIMENTS

Figure 1:
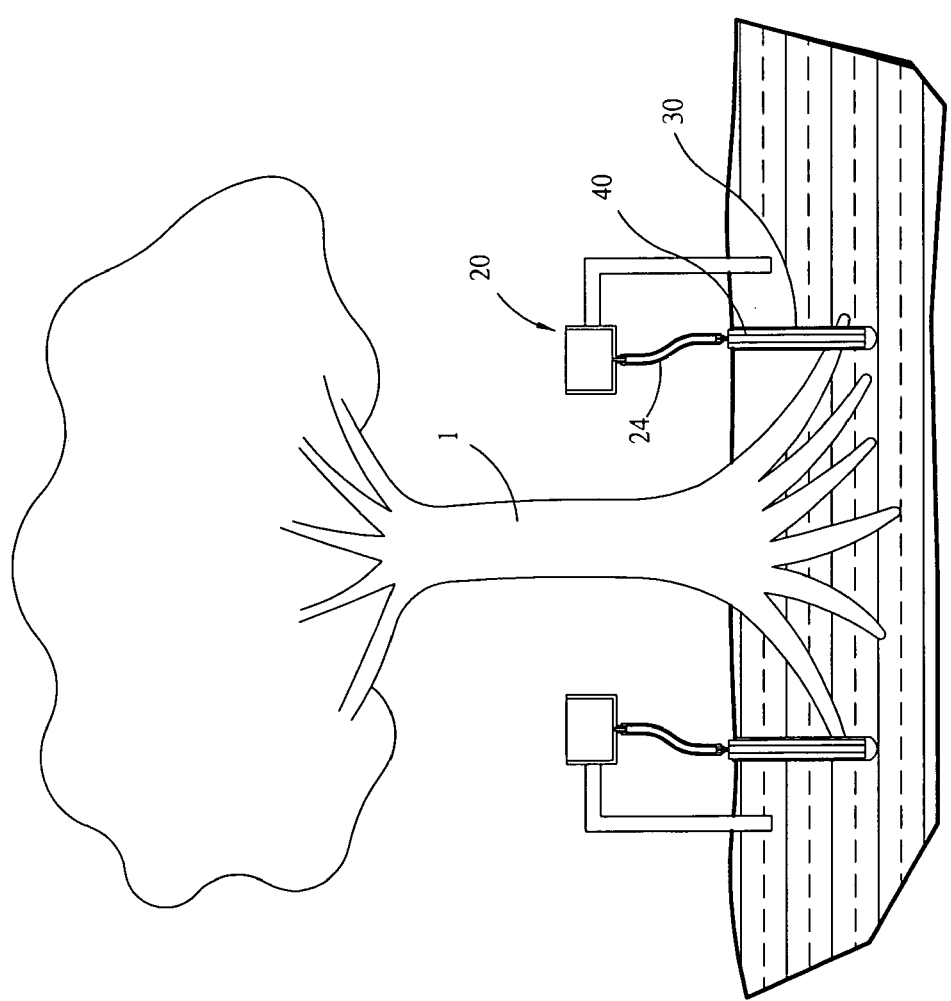
FIG. 1 is a schematic illustration of installing of the watering and fertilizing device of the present invention.
Figure 2:
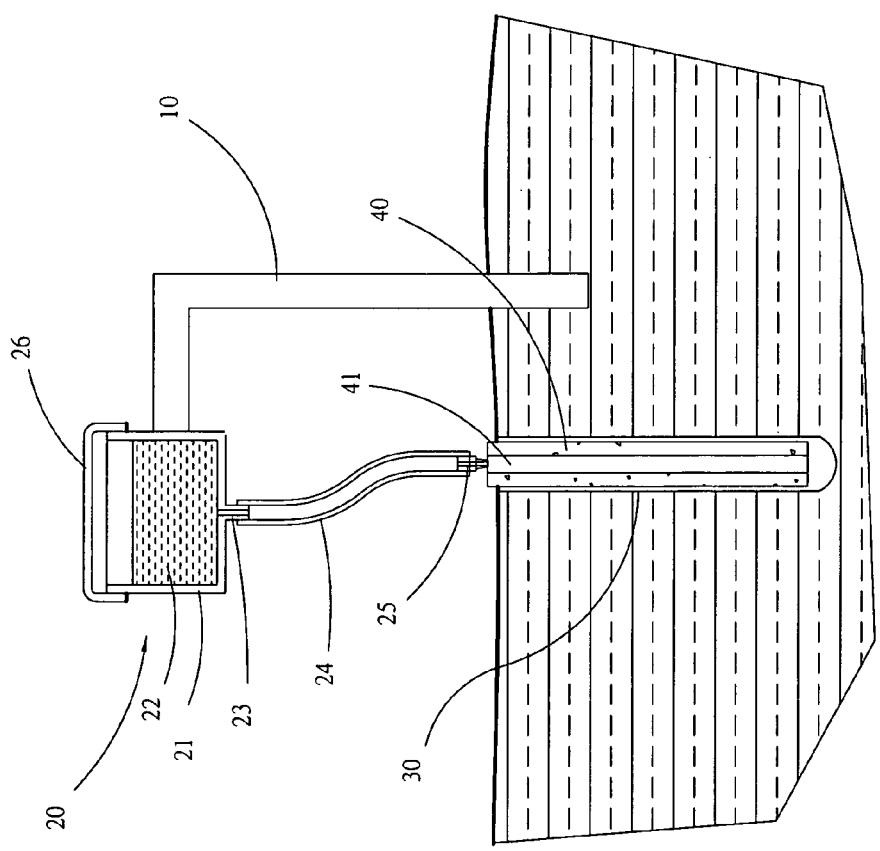
FIG. 2 is a longitudinal sectional view of the watering and fertilizing device of the present invention in the first embodiment.

As shown in FIGS. 1 and 2, the watering and fertilizing method of the present invention comprises the following steps: placing fertilizer, basic fertilizer for plants, in fertilizing columns 40; boring vertical holes 30 in the ground around a plant 1 to be fertilized at positions and depths that correspond to the size and watering requirements of the plant 1; inserting the fertilizing columns 40 into the vertical holes 30, respectively; installing a water supply system 20, so that water is continuously and at a low flow rate led into the fertilizing columns 40, further flowing into surrounding soil.

As shown in FIG. 2, the fertilizing columns 40 contain organic or anorganic fertilizer or a mixture thereof, with optionally gluing material or other material having been added. The fertilizing columns 40 slowly release organic substances and nutrient into surrounding soil, which are absorbed by roots, replenishing nutrients for useful microorganisms and earthworms and helping to maintain biodiversity of soil.

Each of the fertilizing columns 40 is shaped like an elongated rod, (i.e. tubular), having a plurality of holes through which liquid pass, so that water is transferred into surrounding soil. Each of the fertilizing columns 40 has a length according to roots of the plant 1 to be watered, typically between 30 cm and 1 m, and a diameter that is adapted to a required quantity of supplied fertilizer, typically between 5 cm and 20cm.

Each of the fertilizing columns 40 has a longitudinal empty core 41 extending substantially the full length of the column at a central position with an upper end having a water inlet. Alternatively, no longitudinal chamber 41 is provided, and water is let in and stored directly. Each of the fertilizing columns 40 is inserted into the ground, having an upper end that is level with the ground surface or slightly protrudes therefrom to prevent soil from falling in.

Referring to FIG. 3, in a second embodiment of the present invention, each of the fertilizing columns 40 is a fertilizing column 40A with a structure of two layers. An intermediate layer 42A surrounds a central axis of the fertilizing column 40A and is in turn surrounded and abutted by an outer layer 43A. The intermediate layer 42A is made of wood, bamboo or plastics and serves to reinforce the fertilizing column 40A. As shown in FIG. 4, in a third embodiment of the present invention, each of the fertilizing columns 40 is a fertilizing column 40B with a core 44B made of absorbent material to allow for better absorbing and storing of water.

The water supply system 20 provides a steady flow of dripping water into the fertilizing columns 40, which pass on water enriched by fertilizer into surrounding soil. The water supply system 20 comprises at least one container 21, mounted on a frame 10 at a certain height and containing water 22, which is manually filled in or supplied by a pipe. The container 21 has a cover 26 to prevent dirt from falling in. Any regular vessel of suitable size is usable, e.g., a water bottle, so that cost is kept low.

The container has a bottom with an outlet 23. At least one tube 24 leads from the outlet 23 to at least one of the fertilizing columns 40. The tube 24 has a lower end with a dripping head 25, which is attached to or hangs freely above one of the fertilizing columns 40 at the upper end thereof, ensuring a steady supply of dripping water. The dripping head 25 is preferably, to keep cost low, embodied as a shower head.

Figure 5:
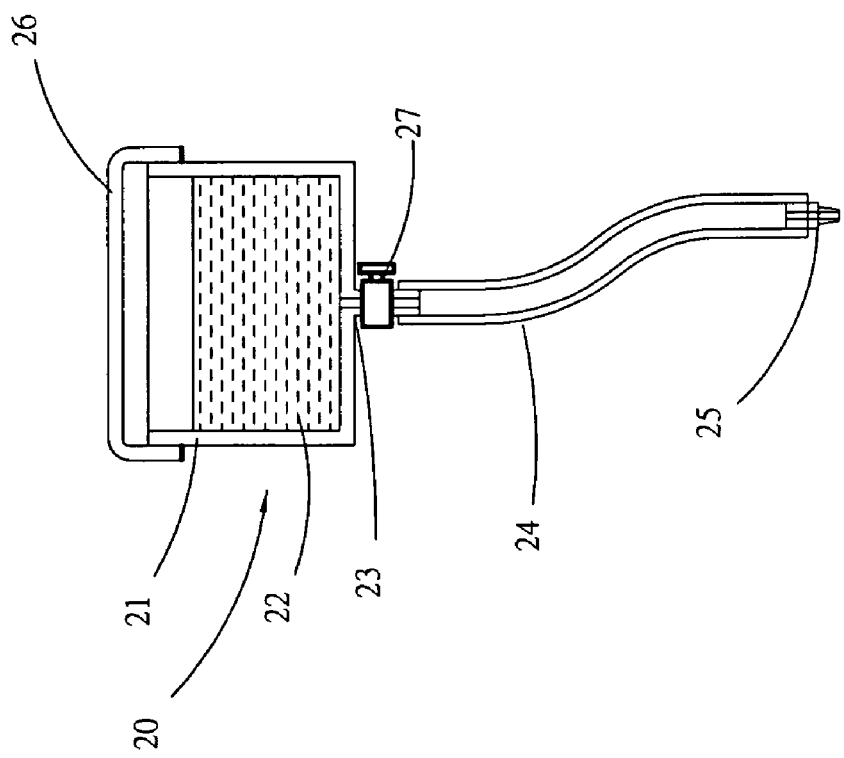
FIG. 5 is a longitudinal sectional view of the container of the present invention in the fourth embodiment.

Referring to FIG. 5, in a fourth embodiment of the present invention, an adjusting valve 27 is mounted at the outlet 23 of the container 21, allowing to control water flow through the tube 24 and the dripping head 25.

The container 21 is filled with pure water or with fertilizer that is dissolved in water and flows into soil along with water.

The present invention achieves the following effects:

1. Water is led into deeper layers of soil, so that waste of water is minimized. Growth of watered plants is directed around the fertilizing columns 40, so that water and nutrients are supplied directly and efficiently.

2. Growth of roots of watered plants is not restricted to upper layers of soil, so that the present invention is suitable for hillside and desert areas.

3. Growth of roots of watered plants is oriented towards the fertilizing columns 40, so that therefrom released nutrients directly reach and are readily absorbed by watered plants.

4. By leading water and fertilizer into deeper layers of soil, washing out of soil by water is avoided and no sealing of the ground surface will occur. Organic fertilizer released from the fertilizing columns 40 provides nutrients for useful microorganisms and earthworms, furthering biodiversity of soil.

5. Watering and fertilizing of plants are achieved at low cost.

6. Complicated and expensive structural parts, like a pump, pipes or spraying heads are not required, so that cost is saved.

While preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

The invention claimed is:

1. A watering and fertilizing device, comprising:
   at least one fertilizing column, having an elongated rod shape and a longitudinal core normally empty of fertilizer and extending substantially the full length of the column, with an upper end of the core having a water inlet, said core being surrounded by organic or anorganic fertilizer, and releasing said organic or anorganic fertilizer into surrounding soil for watering and fertilizing a plant;
   a water supply system, further comprising at least one container filled with irrigating water, with at least one tube leading therefrom to said water inlet of said core of said at least one fertilizing column.

2. The watering and fertilizing device of claim 1, wherein said at least one fertilizing column contains organic fertilizer, anorganic fertilizer or a mixture thereof.

3. The watering and fertilizing device of claim 1, wherein said at least one fertilizing column has a reinforcing layer surrounding said core, which in turn is surrounded by a layer of fertilizer.

4. The watering and fertilizing device of claim 1, wherein said at least one fertilizing column has a core made of water-absorbing material.

5. The watering and fertilizing device of claim 1, wherein said at least one fertilizing column has a longitudinal empty core with an upper end through which irrigating water is let in.

6. A watering and fertilizing device, comprising:
   at least one fertilizing column, having an elongated rod shape and a longitudinal core extending substantially the full length of the column with an upper end having a water inlet, said core being surrounded by organic or anorganic fertilizer, and releasing said organic or anorganic fertilizer into surrounding soil for watering and fertilizing a plant; and a water supply system, further comprising at least one container filled with irrigating water, with at least one tube leading therefrom to said water inlet of said at least one fertilizer column;

wherein said at least one container has a bottom with an outlet to which said at least one tube is attached, said at least one tube having a far end carrying a dripping head for releasing water at a definite low rate.

7. The watering and fertilizing device of claim 6, wherein at said outlet of said at least one container an adjusting valve is installed for regulating outflow of water.

* * * * *